Aug. 22, 1939.  J. E. ANDERSON  2,170,673
WIRE-FEEDING DEVICE
Filed Oct. 16, 1937
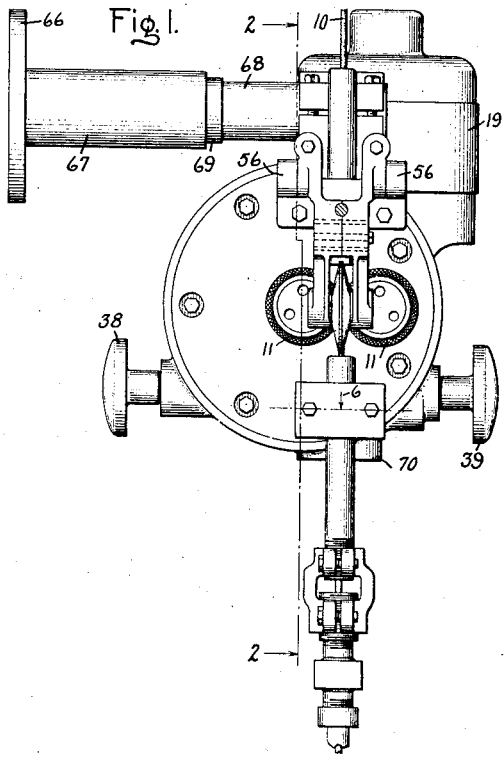
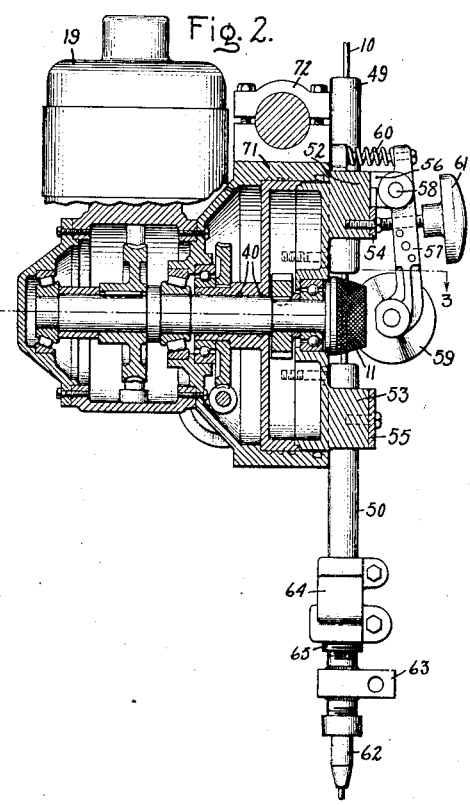
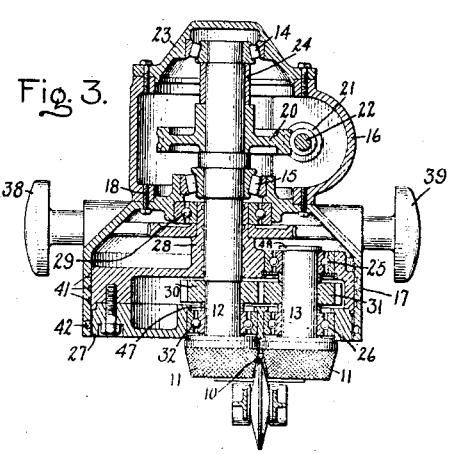
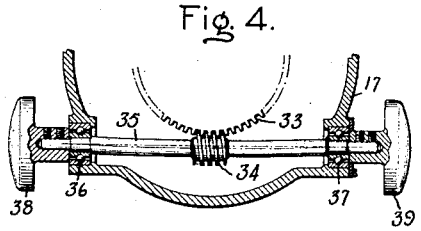
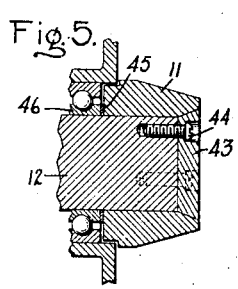
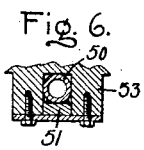
Inventor:
Jasper E. Anderson,
by Harry E. Dunham
His Attorney Patented Aug. 22, 1939

2,170,673

UNITED STATES PATENT OFFICE 2,170,673

WIRE-FEEDING DEVICE

Jasper E. Anderson, Scotia, N. Y., assignor to General Electric Company, a corporation of New York Application October 16, 1937, Serial No. 169,447

16 Claims. (Cl. 140—125)

My invention relates to wire feeding devices, and more particularly to wire feeding devices suitable for forming a component part of automatic arc welding heads.

In arc welding, a wire or rod, known as an electrode, is progressively fused and deposited to form a weld by an arc established between its terminal and the work to be welded. When means are provided for feeding the electrode to the work at a rate commensurate with its consumption in the arc during welding, this means is commonly referred to as an automatic arc welding head. Usually this means embodies a control which is responsive to an electrical characteristic of the welding circuit and which functions in conjunction with the welding head to feed the electrode to and from the work to strike and thereafter maintain the welding arc.

Due to variations in size of electrodes required for various welding operations, some means must be provided for adapting the feeding mechanism of an arc welding head to the various sizes of electrode employed. When the feed rolls are adjusted relatively to one another for this purpose, the gearing interconnecting the feed rolls works at a great disadvantage due to imperfect meshing of the gears as well as to lack of proper lubrication both of which result from the constructions necessarily employed. When different sizes of feed rolls are used, the change from an electrode of one size to an electrode of another size requires considerable time and is regarded as a nuisance by the operator.

It is an object of my invention to provide a wire feeding device which is capable of feeding wires of various sizes and shapes without requiring an adjustment of the feed rolls relative to one another.

It is a further object of my invention to provide a wire feeding device in which the feed roll shafts are supported in fixed relationship relative to one another in a gear box which totally encloses the gearing interconnecting these shafts as well as the lubricant used for this gearing.

It is a further object of my invention to provide a wire feeding device in which the several parts are so arranged that the wire fed by said device may be accurately directed within a predetermined plane while the feeding device is in operation.

Further objects of my invention will become apparent from the following description of one embodiment thereof wherein a wire feeding device embodying my invention is illustrated as forming a part of the physical structure of an automatic arc welding head.

In this drawing, Fig. 1 is a front view; Fig. 2 is a side sectional view along the line 2—2 of Fig. 1; Fig. 3 is a top sectional view along line 3—3 of Fig. 2; Fig. 4 is a partial view illustrating in detail the construction of an adjusting means for determining the direction of wire feed; Fig. 5 is an enlarged view showing the manner in which the feed rolls are supported on their shafts; and Fig. 6 is a partial sectional view along line 6 of Fig. 1 illustrating the construction and support of the wire guides forming a part of the device.

In the wire feeding device illustrated in the drawing, a wire 10 is engaged and fed by bevel rolls 11 which are supported on main and auxiliary shafts 12 and 13 with their bevel working surfaces forming a V-shaped space between them. These bevel surfaces may be knurled as illustrated. Main shaft 12 is journaled in bearings 14 and 15 located in a frame formed of two parts 16 and 17 bolted together at 18. This shaft is rotated by a motor 19 which is connected thereto through a worm wheel 20 and a worm 21 keyed respectively to main shaft 12 and motor shaft 22. It will be noted that bearing 15 is supported in a flanged portion of frame section 17, and that bearing 14 is supported in a cover plate 23 bolted to frame section 16. These bearings engage shoulders on main shaft 12 and the assembly is completed by a sleeve 24 mounted on main shaft 12 between bearing 14 and worm wheel 20.

Auxiliary shaft 13 is journaled in bearings 25 and 26 located in the opposite walls of a cylindrical gear box 27 which is supported within a cylindrical cavity in frame section 17 for rotation about the axis of rotation of main shaft 12. This gear box is formed of two sections which are bolted together and the inner section of the gear box is provided with a projecting portion 28 which is mounted in a bearing 29 supported in the flanged portion of frame section 17 which also constitutes a support for bearing 15. Main shaft 12 and auxiliary shaft 13 are interconnected by gears 30 and 31 keyed thereto and totally enclosed within gear box 27. A bearing 32 is also provided in the gear box for supporting the feed roll end of main shaft 12.

Gear box 27 may be rotated within its supporting frame 16, 17 by means of a worm wheel 33 which is engaged by a worm 34 supported on an elastic shaft 35. Worm wheel 33 is mounted on portion 28 of the inner section of gear box 27 and the ends of shaft 35 are supported in bearings 36 and 37 mounted in frame section 17.

Hand wheels 38 and 39 are attached to the projecting ends of shaft 35 for rotating it.

As shown in Fig. 4, it will be noted that flexible shaft 35 is bowed by reason of its support in frame section 17 to bias worm 34 into firm engagement with worm wheel 33. The center line of the shaft relative to the center line extending between its bearings 36 and 37 illustrates the amount this shaft has been bent to accomplish this purpose. It is, of course, apparent that worm wheel 33 and worm 34 are merely illustrative of typical elements of any suitable transmission which may be used for connecting shaft 35 to gear box 27.

Where bevel feed rolls are provided, main and auxiliary shafts 12 and 13 are parallel to one another and gearing 30 and 31 connecting these shafts may be so adjusted relative to one another as to obtain the best working conditions. Furthermore, these gears may be immersed in a suitable lubricant contained within the totally enclosed gear box 27.

At this time, it may be well to point out that gearing 20 and 21 between feed motor shaft 22 and main shaft 12 is also totally enclosed within frame section 17 and may be lubricated by a suitable lubricant contained within this enclosure. Since the lubricant used in the gear chamber in frame section 17 is usually lighter than that used in gear box 27, the journal in the projecting portion 28 of gear box 27 is provided with a plurality of grooves 40 which are adapted to contain a heavy lubricant, such as a fibrous grease, to prevent passage of lubricant from the gear chamber within frame section 16 to the chamber within gear box 27 or the passage of lubricant from gear box 27 to the gear chamber in frame section 16. Where the periphery of the gear box 27 engages the frame section 17, similar grooves 41 are provided as is a packing 42. This prevents any leakage of lubricant between the gear box 27 and frame section 17 within which it is supported. Suitable means, not shown in the drawing, are provided for lubricating motor shaft 22 and for supplying lubricant to gears 20 and 21 enclosed within frame section 16. A breathing opening is also provided in the frame for the chamber in frame section 17 containing gears 33 and 34. This effectively reduces the passage of lubricant into this chamber from the gear chamber in frame section 16.

Feed rolls 11 may be attached to their shafts in any suitable manner. As shown in Fig. 5, a plate 43 having a bevel edge is attached by screws 44 to the ends of the shafts and engages corresponding bevel edges of feed rolls 11 forcing them into engagement with washers 45 which engage the inner portions 46 of ball bearings 32 and 26 of main and auxiliary shafts 12 and 13. This pressure is transmitted along main shaft 12 through a spacer sleeve 47 and gear 30 to a shoulder on this shaft. In a like manner, this pressure is transmitted along auxiliary shaft 13 to the flanged portion 48 on the inner end thereof.

Wire 10 is directed to and from feed rolls 11 by wire guides 49 and 50. These wire guides are provided with offset portions 51 (see Fig. 6) which adapt them for reversible mounting in grooved bosses 52 and 53 constituting their support and forming a part of the outer section or cover of gear box 27. This reversible mounting of the wire guides makes it possible to support them on the gear box in a manner to direct the wire passing through them to the more constricted or less constricted portion of the tapered gap between the feed rolls depending whether the offset portions of these guides is positioned next to or away from the cover plate of the gear box. These guides are held within bosses 52 and 53 by straps 54 and 55 bolted thereto.

Boss 52 on the cover of gear box 27 is also provided with lugs 56 which provide bearings for pins on which an arm 57 is pivoted at 58. This arm supports at one end a pressure roller 59 whose tread portion is located between feed rolls 11. This roller is biased toward the more constricted portion of the tapered gap between the feed rolls by springs 60 which engage the other end of the lever 57. It will be noted that the construction is such that the pressure of roller 59 on a wire engaged thereby increases the more it is displaced from feed rolls 11. This is a desirable arrangement in that much less pressure is required for forcing small wires into driving engagement with the bevel surface of the feed rolls than is required for large wires. The movement of pressure roll 59 toward feed rolls 11 is limited by an adjusting screw 61 supported in arm 57 and having an end portion which engages strap 54 which holds guide 49 in boss 52. Arm 57 is formed in two parts bolted together to hold pressure roll 59 and its axle in assembled relation therein.

When the wire feeding device above described is used as a part of an automatic arc welding head, means are provided at the discharge end of wire guide 50 for supplying welding current to the electrode fed therethrough. This means comprises an electrode engaging nozzle 62 which is electrically connected through a terminal 63 to a supply of welding current. The nozzle and terminal assembly is supported from the end of wire guide 50 by means of a clamp 64, one portion of which engages wire guide 50 and the other portion of which engages the nozzle and terminal assembly through the intermediary of an electrically insulating bushing 65.

The welding head as a unit may be attached to a suitable support by means of a bracket having a flanged portion 66 and an arm portion formed of sections 67 and 68 which are electrically insulated from one another by a bushing 69. Flange portion 66 of this arm may be suitably attached to any support. Frame section 17 of the head is provided with bosses 70 and 71 on either of which may be mounted a clamp 72 which engages the arm portion 68 of the bracket previously described. This method of support makes possible any desired angular adjustment of the welding head about the longitudinal axis of its supporting arm.

Any suitable control system may be employed for controlling the speed of motor 19 in a manner to feed the electrode to strike and maintain a welding arc. The construction and arrangement of parts in the welding head illustrated functions particularly well with a control such as disclosed and claimed in application Serial No. 155,509, William D. Cockrell, filed July 24, 1937, for Electric control circuit, and assigned to the assignee of this application.

It is, of course, apparent that many modifications may be made in the wire feeding device above described without departing from the spirit and scope of my invention. Thus it is apparent that my invention is not limited to the use of bevel feed rolls since feed rolls of other configurations may be used provided the working surfaces of these feed rolls are positioned relative to one another to form a tapered gap between them. The feed rolls may be formed of metal or non-metal and their working surfaces need not be knurled as in the illustrated embodiment. Furthermore, various forms of wire guides may be employed for directing the wire to and from the feed rolls. Means other than the pressure roll 59 above described may also be employed for biasing the wire toward the more constricted portion of the tapered gap between the feed rolls. Thus, while I have shown and described but one embodiment of my invention, it will be understood that other embodiments will occur to those skilled in the art, and I, therefore, intend to cover by the appended claims all modifications of my invention which fall within the true spirit and scope thereof.

What I claim as new and desire to secure by Letters Patent of the United States, is:

1. A wire feeding device comprising roller means having working surfaces which simultaneously engage a wire to be fed and are positioned relative to one another to form a tapered opening therefor, means for directing a wire lengthwise through said opening, and means for biasing said wire to the more constricted portions of said opening into simultaneous engagement with said working surfaces of said roller means.

2. A wire feeding device comprising feed rolls positioned relatively to one another to form between their adjacent working surfaces a tapered gap the more constricted portion of which is smaller than the wire to be fed, and means for directing a wire lengthwise through said gap and for biasing it toward the more constricted portion of said gap into simultaneous engagement with the working surfaces of said feed rolls.

3. A wire feeding device comprising feed rolls positioned relatively to one another to form between their adjacent working surfaces a tapered gap the more constricted portion of which is smaller than the wire to be fed, means for directing a wire lengthwise through said gap between said feed rolls, and means located between said feed rolls and biased toward the more constricted portion of the gap between said feed rolls for holding said wire in simultaneous engagement with the working surfaces of said feed rolls.

4. A wire feeding device comprising a pair of bevel feed rolls positioned relatively to one another so that their adjacent tapered working surfaces form a V-shaped space the more constricted portion of which is smaller than the wire to be fed, and means for directing a wire lengthwise through said V-shaped space and for biasing said wire toward the more constricted portion thereof into simultaneous engagement with the tapered working surfaces of said feed rolls.

5. A wire feeding device comprising spaced parallel shafts, gearing connecting said shafts, bevel feed rolls supported on said shafts with their adjacent bevel surfaces forming a V-shaped space the more constricted portion of which is smaller than the wire to be fed, and means for directing a wire transversely through said V-shaped space and for biasing said wire toward the more constricted portion thereof into simultaneous engagement with the bevel surfaces of said feed rolls.

6. A wire feeding device comprising a support, feed rolls mounted on said support and positioned relatively to one another to form between their adjacent working surfaces a tapered gap the more constricted portion of which is smaller than the wire to be fed, wire engaging means positioned within said gap between said feed rolls opposite the working surfaces thereof, and means for biasing said wire engaging means toward the more constricted portion of said gap between said feed rolls with a pressure that increases the more said wire engaging means is displaced from said feed rolls.

7. A wire feeding device comprising a support, feed rolls mounted on said support and positioned relatively to one another to form a tapered gap between their adjacent working surfaces, means for driving said feed rolls, means for biasing a wire toward the more constricted portion of said gap between said feed rolls, a wire guide having an offset portion which may be used to space said guide from said support, and means for reversibly mounting said wire guide on said support in line with said tapered gap with said offset portion next to or away from said support to direct a wire passing through said guide to selected portions of said tapered gap.

8. A wire feeding device comprising a gear box, a pair of parallel shafts supported in fixed relationship relative to one another in said gear box and having corresponding end portions projecting from one face of said gear box, gearing connecting said shafts, means for rotating one of said shafts, bevel feed rolls supported on the corresponding end portions of said shafts projecting from said face of said gear box, and means supported on said face of said gear box for directing a wire between the bevel surfaces of said feed rolls and for biasing said wire toward the more constricted portion of said V-shaped space between said feed rolls into engagement with the bevel surfaces thereof.

9. A wire feeding device comprising a totally enclosed gear box, a pair of parallel shafts supported in fixed relationship relative to one another in said gear box and having corresponding end portions projecting from one face of said gear box, gearing connecting said shafts and enclosed within said gear box, means for rotating one of said shafts, bevel feed rolls supported on the corresponding end portions of said shafts projecting from said face of said gear box, and means supported on said face of said gear box for directing a wire between the bevel surfaces of said feed rolls and for biasing said wire toward the more constricted portion of said V-shaped space between said feed rolls into engagement with the bevel surfaces thereof.

10. A wire feeding device comprising a gear box, a pair of parallel shafts supported in fixed relationship relative to one another in said gear box and having corresponding end portions projecting from one face of said gear box, gearing connecting said shafts, means for rotating one of said shafts, bevel feed rolls supported on the corresponding end portions of said shafts projecting from said face of said gear box, conduit means supported on said face of said gear box for directing a wire between the bevel surfaces of said feed rolls, a pressure roll supported on said face of said gear box and having its tread portion located between said feed rolls, means for biasing said pressure roll toward said feed rolls, and means for limiting the movement of said pressure roll toward said feed rolls.

11. A wire feeding device comprising a pair of bevel feed rolls, parallel main and auxiliary shafts on which said feed rolls are supported with their bevel surfaces forming a V-shaped space between them, a frame within which said main shaft is journaled, means for rotating said main shaft, a gear box supported for rotation within said frame about the axis of rotation of said main shaft and constituting a support for said auxiliary shaft, gearing between said main and auxiliary shafts and enclosed within said gear box, means supported by said frame and acting on said gear box for rotating said gear box relatively to said frame about the axis of said main shaft, and means located on the same side of said gear box as said feed rolls for directing a wire between and into engagement with the bevel surfaces of said feed rolls.

12. A wire feeding device comprising a pair of bevel feed rolls, parallel main and auxiliary shafts on which said feed rolls are supported with their bevel surfaces forming a V-shaped space between them, a frame within which said main shaft is journaled, means for rotating said main shaft, a gear box supported for rotation within said frame about the axis of rotation of said main shaft and constituting a support for said auxiliary shaft, gearing between said main and auxiliary shafts enclosed within said gear box, means supported by said frame and acting on said gear box for rotating said gear box relatively to said frame about the axis of said main shaft, a pressure roll located between said feed rolls and biased toward them, and means for limiting the movement of said pressure roll toward said feed rolls.

13. A wire feeding device comprising a pair of feed rolls, a main shaft and an auxiliary shaft on which said feed rolls are supported, a frame within which said main shaft is journaled, a gear box supported for rotation within said frame about the axis of rotation of said main shaft and constituting a support for said auxiliary shaft, gearing between said main and auxiliary shafts enclosed within said gear box, and means for rotating said gear box relatively to said frame about the axis of rotation of said main shaft, said means including an elastic shaft supported by said frame and acting on said gear box through the agency of a transmission one element of which is attached to said gear box and another element of which is attached to said elastic shaft, said elastic shaft being bent by reason of its support to bias said elements of said transmission into firm engagement with one another.

14. A wire feeding device comprising a pair of feed rolls, a main shaft and an auxiliary shaft on which said feed rolls are supported, a frame within which said main shaft is journaled, a gear box supported for rotation within said frame about the axis of rotation of said main shaft and constituting a support for said auxiliary shaft, gearing between said main and auxiliary shafts enclosed within said gear box, and means for rotating said gear box relatively to said frame about the axis of said main shaft, said means including a bowed shaft and a transmission between said bowed shaft and said gear box, the end portions of said bowed shaft being supported by said frame and the mid-portion thereof supporting one element of said transmission which is biased by said bowed shaft into engagement with another element of said transmission mounted on said gear box.

15. A wire feeding device comprising a pair of bevel feed rolls, parallel main and auxiliary shafts on which said feed rolls are supported with their bevel surfaces forming a V-shaped space between them, a frame within which said main shaft is journaled, a gear box supported for rotation within said frame about the axis of rotation of said main shaft and constituting a support for said auxiliary shaft, gearing between said main and auxiliary shafts enclosed within said gear box, means supported by said frame and acting on said gear box for rotating said gear box relatively to said frame about the axis of rotation of said main shaft, a pressure roll supported on said gear box and located between said feed rolls, means for biasing said pressure roll toward the more constricted portion of the V-shaped space between said feed rolls, and means for limiting the movement of said pressure roll toward the more constricted portion of the V-shaped space between said feed rolls.

16. A wire feeding device comprising a pair of bevel feed rolls, parallel main and auxiliary shafts on which said feed rolls are supported with their bevel surfaces forming a V-shaped space between them, a frame within which said main shaft is journaled, a motor supported on said frame, gearing within said frame and between said motor and said main shaft, a gear box constituting a support for said auxiliary shaft and in turn supported for rotation within said frame about the axis of rotation of said main shaft, gearing between said main and auxiliary shafts enclosed within said gear box, a worm wheel mounted on said gear box for rotation about the axis of rotation of said main shaft, a worm meshing with said worm wheel, a bent elastic shaft supporting said worm and biasing it into firm engagement with said worm wheel, said shaft being bent by its support in said frame relative to said worm and worm wheel, means for rotating said bent elastic shaft, wire guides having offset portions which may be used to space said guides from their support, means for reversibly supporting said guides on said gear box on opposite sides of said feed rolls in line with the V-shaped space between them with said offset portions next to or away from said gear box, a pressure roll supported on said gear box and located between said feed rolls, means for biasing said pressure roll toward the more constricted portion of the V-shaped space between said bevel rolls with a pressure that increases the more said pressure roll is displaced from said feed rolls, and means for limiting the movement of said pressure roll toward the more constricted portion of the V-shaped space between said pressure rolls.

JASPER E. ANDERSON.